United States Patent [19]

Ito et al.

[11] Patent Number: 4,844,853
[45] Date of Patent: Jul. 4, 1989

[54] METHOD OF MAKING MOLD USED IN PRESSURE SLIP CASTING

[75] Inventors: Haruyuki Ito; Akio Matsumoto, both of Kitakyushu, Japan

[73] Assignee: Toto Ltd., Kitakyushu, Japan

[21] Appl. No.: 82,408

[22] Filed: Jul. 24, 1987

[30] Foreign Application Priority Data

Jul. 26, 1986 [JP] Japan .................. 61-176371

[51] Int. Cl.⁴ .............................. B29C 39/12
[52] U.S. Cl. ..................... 264/225; 264/86; 264/250; 264/278; 264/313; 249/141; 425/3; 425/DIG. 33
[58] Field of Search ............... 264/86, 87, 129, 130, 264/133, 134, 135, 219, 220, 225, 226, 227, 221, 246, 247, 250, 251, 264, 271, 136, 275, 278, 299, 300, 304, 307, 313, 317, DIG. 43, 279, DIG. 63, DIG. 64; 249/58, 62, 113, 114, 115, 134, 135, 141, 160, 142; 425/84, 85, 86, 437, 812, 3, DIG. 102, DIG. 33

[56] References Cited

U.S. PATENT DOCUMENTS

| 1,525,797 | 2/1925 | Blum | 264/278 |
| 2,964,821 | 12/1960 | Mechan | 264/278 |
| 2,979,801 | 4/1961 | Gasmire | 264/278 |
| 3,243,860 | 4/1966 | Whittaker et al. | 25/129 |
| 3,286,974 | 11/1966 | Dean | 249/142 |
| 3,723,584 | 3/1973 | Nussbaum | 264/219 |
| 4,191,722 | 4/1980 | Gould | 264/278 |
| 4,413,966 | 11/1983 | Mills | 264/86 |
| 4,673,542 | 6/1987 | Wigner | 425/DIG. 33 |

FOREIGN PATENT DOCUMENTS

| 0211653 | 2/1987 | European Pat. Off. | 264/87 |
| 58-17811 | 4/1963 | Japan . | |
| 56-14451 | 4/1981 | Japan . | |
| 58-2028005 | 12/1983 | Japan . | |
| 60-8010 | 1/1985 | Japan . | |
| 0179212 | 9/1985 | Japan | 264/219 |
| 1295055 | 11/1972 | United Kingdom . | |

Primary Examiner—James Lowe
Assistant Examiner—Jeremiah F. Durkin, II
Attorney, Agent, or Firm—Fleit, Jacobson, Cohn & Price

[57] ABSTRACT

Herein disclosed is a method of making a porous mold by using an upper case which bears lines for forming channels for water and air communications. The method of making a porous mold includes attaching holding members in an array at a desired interval to an upper case made of a rigid material such that they project a predetermined distance from the inner surface of said upper case; removably attaching flexible lines to said holding members; passing at least one end of each of said flexible lines through said upper case to the outside of said upper case;

casting slurry into a molding cavity which is defined by said upper case and a base joined to the former case to form a porous mold; removing said upper case together with said holding members from the porous mold after said slurry has cured so that said holding members are disengaged from said flexible lines to leave the latter in said porous mold; filling up the holes, which are left in the porous mold at the traces of said holding members, with a resin; and pulling said flexible lines out of the porous mold to form channels in said porous mold after said resin has cured.

16 Claims, 10 Drawing Sheets

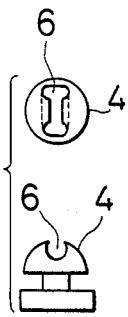
FIG.18
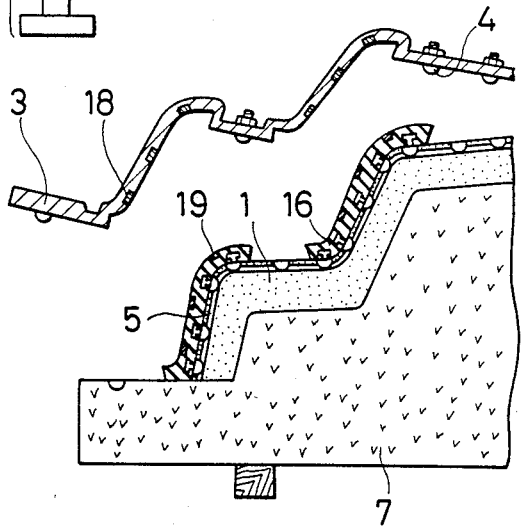
FIG.19
FIG.20
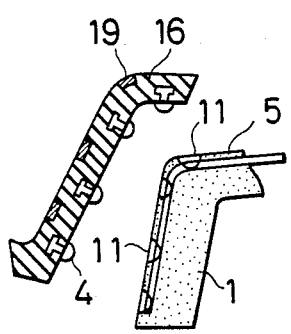
FIG.21
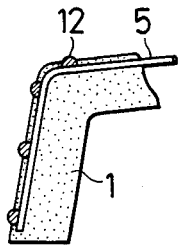
FIG.22
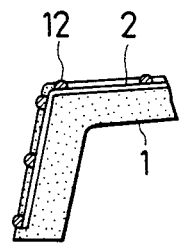

METHOD OF MAKING MOLD USED IN PRESSURE SLIP CASTING

BACKGROUND OF THE INVENTION

1. Field of the Invention

The present invention relates to a method of making a porous mold used in pressure slip casting ceramic articles.

2. Description of the Prior Art

For making most ceramic articles having a large size and complicated shape, there has been adopted for a long time a nonpressurized slip casting process using a gypsum mold. In the slip casting process, however, water is absorbed from slip into the mold by its capillary action so that the casting rate cannot be improved drastically. When the gypsum mold is saturated with the water, its capillary action is so weakened that the mold has to be dried for a long time after every one or two uses.

Therefore, a pressure casting process has recently been developed to eliminate these defects and to drastically improve productivity.

In this pressure casting process, the slip is cast under a pressure of several to 30 Kg/cm$^2$ into a space between two mold parts, i.e., a mold cavity. The porous mold is made by filling up a space between a reinforcing, pressure-resisting iron container or a case and a base with a porous mold forming slurry or powder (e.g., a mixture of an epoxy resin and sand) and by curing the slurry or powder to form a structure integral with the reinforcing iron container or box.

According to this structure, it is remarkably difficult to make the strong pressure-resisting container or reinforcing iron box identical in shape to the product or article to be cast. Due to this difficulty, the porous layer will have a locally large thickness.

The excessive thickness of the porous layer will result in an increase of the elastic compression strain due to the slip pressure during the pressure casting to make the corners of the porous layer liable to be cracked. When the cast product is to be removed from the mold, moreover, there arises another defect in that the reaction of the compression strain causes the porous layer to bite the product, thus making the removal or demolding difficult. On the other hand, the pressure casting process is required to have not only drain passages for draining water which has been forced during the casting into the porous mold but also compressed air passages for injecting air and water into the molding surface through the porous mold when the product is to be removed from the mold. In case the mold is constructed of two upper and lower parts, for example, the upper part of the mold has to be evacuated during removal of the product from the lower mold part, so that the product may be attracted to the upper mold part but not drop. For this purpose, the air passages are also indispensable. These passages may be commonly shared and should have an interval and spacing from the molding surface to effect even injections of the water and air thereby to avoid trouble during the demolding. A variety of processes for forming such water and air passages have been proposed but encountered with difficulties in their manufacture and use.

According to one of the processes of the prior art, more specifically, a porous mold having water and air passages is made by forming a wire mesh into a cage held at a desired spacing from the molding surface, by fixing at an appropriate interval either porous tubes or tubular members made of coils covered with cloth, by fixing the cage to a pressure-resisting container at a desired spacing from the molding surface, by joining the pressure-resisting container to a base case to form a molding cavity, and by casting and curing a porous layer forming slurry in the molding cavity. This process is defective in that the cage has to be formed for each mold, in that the cage of wire mesh is difficult to have an accurate shape and to arrange the water passages accurately in the porous layer, and in that it is troublesome to make the tubular members attached to the cage. Because it is difficult to work with water and air passages having a small diameter, a portion of the passages is enlarged at the intersections. This raises problems in the strength of the mold and in the spacing from the molding surface. This thus invites trouble with the intersecting passages.

According to another process proposed (in Japanese Patent Laid-Open No. 8010/1985), flexible or rigid lines are fixed directly in a reinforcing iron box, and this iron box is joined to a base to form a mold cavity. A porous layer forming slurry is cast and cured in the mold cavity. After the slurry has cured, the lines are extracted to form draining passages. According to this process, however, the iron box cannot be identical in shape to the product or article to be formed. As a result, there arises a defect that the water and air passages cannot be formed while having their spacing from the molding surface and their interval selected, as desired.

According to still another process proposed, grooves are rormed in the rear surface of a porous mold formed in advance by means of a tool and are covered with tapes carrying an achesive to form the water and air passages. This process is followed by defects that the dimensional accuracy of the grooves is not achieved and that because of the manual work of adhering the tapes with adhesive to the grooves, the fingers of the workers will be poisoned with the adhesive. Another defect is that the compressed air will leak from the adhered portions, when the mold is used, to break the mold.

SUMMARY OF THE INVENTION

It is, therefore, an object of the present invention to provide a method of making a mold which is freed from the above-specified defects of the prior art and which is easy to make and suitable for use.

According to a first feature of the present invention, there is provided a method of making a porous mold, comprising the steps of: attaching holding members in an array at a desired interval to an upper case made of a rigid material such that they project a predetermined distance from the inner surface of said upper case; removably attaching flexible lines to said holding members; passing at least one end of each of said flexible lines through said upper case to the outside of said upper case; casting slurry into a molding cavity which is defined by said upper case and a base joined to the former case to form a porous mold; removing said upper case together with said holding members from the porous mold after said slurry has cured so that said holding members are disengaged from said flexible lines to leave the latter in said porous mold; filling up the holes, which are left in the porous mold at the traces of said holding members, with a resin; and pulling said flexible lines out of the porous mold to form channels in said porous mold after said resin has cured.

According to a second feature of the present invention, there is provided a method of making a porous mold, comprising the steps of: attaching holding members to an upper case by means of magnets fixed in the inner surface of said upper case at a desired interval; fixing said flexible lines to said holding members with at least one end of each of said flexible lines extended to the outside of said upper case; joining said upper case to a base to form a molding cavity therebetween; casting slurry into said molding cavity to form a porous mold; removing said upper case from said porous mold, after said slurry has cured, to leave said holding members together with said flexible lines in the cured porous mold; extracting said holding members from said porous mold to leave holes; filling up said holes with a resin; and extracting said flexible lines from said porous mold, after said resin has cured, to form channels.

According to a third feature of the present invention, there is provided a method of making a porous mold, comprising the steps of: forming a recess in at least a portion of the inner surface of an upper case made of a rigid material; removably fitting a soft rubber member in said recess in a plane flush with the inner surface of said upper case; attaching holding members at a desired interval and in an array to the inner surface of sai soft rubber member and the remaining portion of the inner surface of said upper case such that said holding members project a predetermined distance; removably fixing flexible lines in said holding members with at least one end of said flexible lines extended through said upper case to the outside of the latter; joining said upper case to a base to form a molding cavity therebetween; casting slurry in said molding cavity to form a porous mold; removing said upper case together with its holding members from the porous mold, after said slurry has cured, to leave said soft rubber member on said porous mold; removing said soft rubber member together with its holding members from said porous mold to leave holes at the traces of said holding members; filling up said holes with a resin; and extracting said flexible lines from said porous mold, after said resin has cured, to form channels in said porous mold.

According to a fourth feature of the present invention, there is provided a method of making a porous mold, comprising the steps of: attaching rigid lines in an extractable manner to an upper case at a desired interval; attaching at least one flexible line to said upper case so as to intersect said rigid lines and to have at least its one end extended to the outside through said upper case; joining said upper case to a base to form a molding cavity therebetween; casting slurry into said molding cavity to form a porous mold; extracting said rigid lines and said flexible line from said upper case after said slurry has cured; and removing said upper case from said porous mold to form channels in said porous mold.

The channels of the porous mold thus made by the foregoing four processes are used to drain the filtrate to the outside of the mold during the pressure slip casting process, and to introduce through the porous mold the water and air evenly onto the molding surface when the cast product is to be released from the mold. If the mold is constructed of upper and lower parts, for example, the product cannot be removed simultaneously from the upper and lower mold parts. The channels are used to evacuate the porous layer of the mold, too. Then, the evacuation causes the product to attract to the upper mold part, and compressed air is blown into the lower mold part to allow it to be released from the product. Next, the upper part is supplied with the compressed air so that the product may be released or removed from the upper part.

For these operations, the channels are composed of one or more trunk channels communicating with the outide of the mold and a plurality of branch channels which intersect and communicate with the trunk channel at one or more points. The trunk and branch channels are arranged in the mold at a desired interval and at a desired spacing from the molding surface. This makes it necessary to close the two ends of each of the branch passages.

In case a large-sized and complicated product is to be demolded, on the other hand, this demolding may be locally liable or reluctant to occur. This may make it necessary to change the pressure of the compressed air to be blown into the mold locally for the smooth demolding operation. If all the channels of the mold in its entirety have communications, the amount of water in the mold may become so partial as to adversely affect the demolding of the product or to locally soften the demolded product. This may make it necessary to divide the channels in the mold into independent blocks so that the water content in the mold may be controlled. According to the present invention, therefore, the channels in the porous mold may desirably be so independent of one another as to have no communication but each have a trunk channel for providing communication to the outside of the mold.

BRIEF DESCRIPTION OF THE DRAWINGS

Other objects, features and advantages of the present invention will become apparent from the following description taken with reference to the accompanying drawings, in which:

FIG. 18 is a top plan view and a front elevation of a holding member to be used with the soft rubber member;

FIG. 19 is similar to FIG. 16 but shows the state in which the upper case is being removed;

FIG. 20 shows in section a portion of the porous mold from which the soft rubber member is being removed;

FIG. 21 shows in section the porous mold in which holes at the traces of the holding members are filled up with a resin;

FIG. 22 shows in section the porous mold from which flexible lines have been extracted;

DESCRIPTION OF THE PREFERRED EMBODIMENTS

The present invention will be described in detail in the following with reference to the accompanying drawings.

Figure 1:
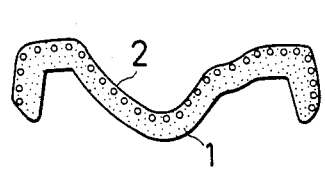
FIG. 1 shows in section a porous mold made by one of the processes of the present invention.
Figure 2:
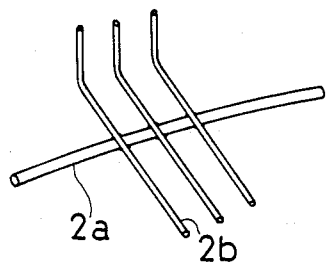
FIG. 2 is a schematic view of channels formed in the porous mold.

FIG. 1 is a section showing a porous mold which is made by the method of the present invention. The porous mold 1 is formed therein with a number of passages such as channels 2 for water and air communications. The channels 2 are composed of inter-secting trunk and branch channels 2a and 2b, as schematically shown in FIG. 2.

Figure 3:
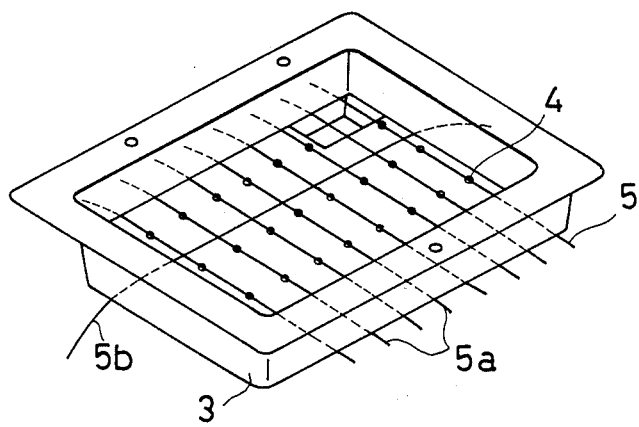
FIG. 3 is a perspective view of an upper case to be used in the method according to the first feature of the present invention.

FIG. 3 shows an upper case 3 which is to be used for making a generally flat porous mold by the method of the present invention. This upper case 3 is made of a rigid material such as fiber reinforced plastic (FRP). To the upper case 3, there are attached through holding members 4 a number of flexible lines 5 which are arranged generally horizontally at a predetermined interval. Reference numeral 5a denotes flexible lines for the branch channels, which are intersected by a flexible line 5b for the trunk channel. All of these flexible lines 5 have their ends extending to the outside of the upper case 3 so that they may be extracted out of the porous mold 1 after this mold 1 has cured. The flexible lines 5 may preferably be formed into a rod or tube shape having a circular or elliptical section and made of an elastic and strong material such as silicone or polyethylene rubber. The lines 5 may desirably have a diameter of 1 to 5 mm.

Figure 5:
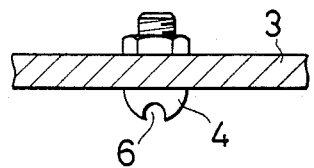
FIG. 5 shows in section a portion of the upper case with a holding member for attaching a flexible line to the upper case.

As best seen from FIG. 5, the holding members 4 for the flexible lines 5 are fixed directly to the upper case 3 at a predetermined interval and array according to the array of the flexible lines 5 and projected a predetermined length from the inner face of the upper case 3. Each of the holding members 4 is formed at its leading end with a dent 6 for removably fixing therein the corresponding one of the flexible lines 5 when the latter is press-fitted.

Figure 4:
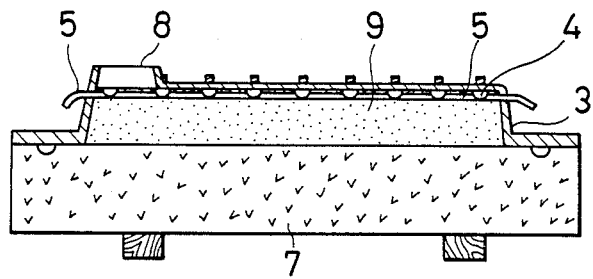
FIG. 4 is a section showing the state in which the upper case is joined to a base to form a mold cavity therebetween for casting slurry.

Thus, as shown in FIG. 4, the upper case 3 carrying the flexible lines 5 is joined to a base 7 to form a mold cavity inbetween, and slurry 9 is poured from a pouring port 8 of the upper case 3 to cast a porous mold.

Figure 6:
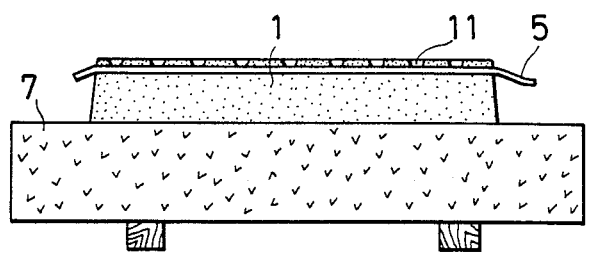
FIG. 6 shows in section the base and the porous mold with the upper case being removed.
Figure 7:
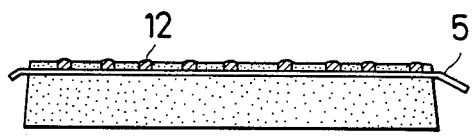
FIG. 7 shows in section the porous mold in the state in which holes at the traces of the holding members are filled up with a resin.
Figure 8:
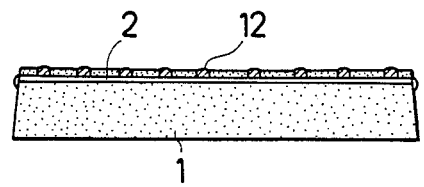
FIG. 8 shows in section the porous mold from which the flexible lines have been extracted.

After the poured slurry 9 has cured, the upper case 3 is removed to leave the porous mold 1 on the base 7 (as shown in FIG. 6). The holding members 4 are disengaged from the flexible lines 5 and pulled up together with the upper case 3 to leave the the flexible lines 5 in the porous mold 1. Holes 11 are formed in the traces of the holding members 4 in the rear surface of the porous mold 1 (as shown in FIG. 6). Next, the holes 11 are filled up with a resin 12, as shown in FIG. 7. This filling resin 12 may preferably be a putty-like adhesive having a low fluidity. After the filling resin 12 has cured, the flexible lines 5 are extracted from the porous mold 1 to leave the channels 2 in the porous mold 1 (as shown in FIG. 8).

The upper case 3 shown in FIG. 3 can be removed from the porous mold without the holding members 4 being caught by the porous mold. In case, however, the porous mold to be formed is shaped to have vertical and/or sloped faces in addition to the horizontal face, the upper case 3 cannot be removed from the porous mold unless the holding members 4 are removably attached to the upper case 3.

Figure 9:
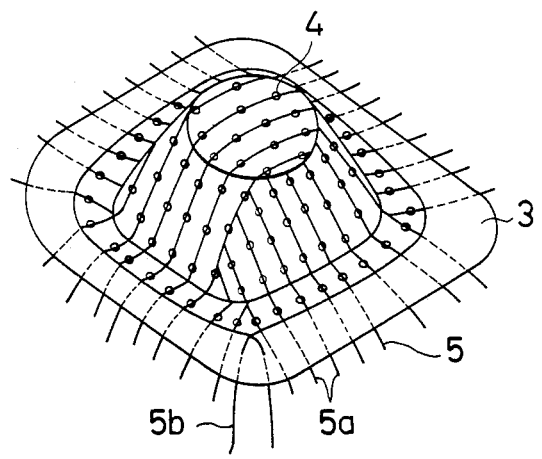
FIG. 9 is a perspective view of an upper case to be used in the method according to the second feature of the present invention.
Figure 10:
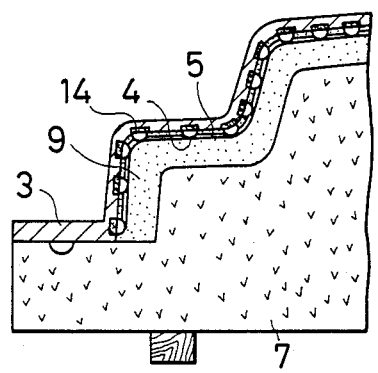
FIG. 10 is similar to FIG. 4 except for that the upper case of FIG. 9 is used.
Figure 11:
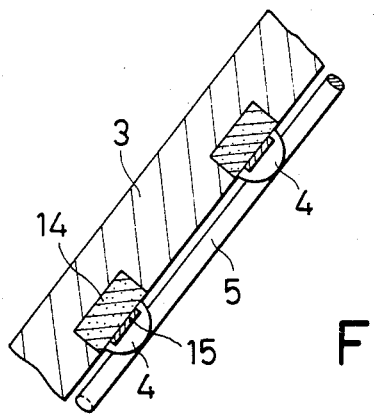
FIG. 11 shows in section the upper case and holding members for attaching flexible lines to the upper case.
Figure 12:
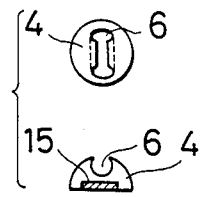
FIG. 12 is a top plan and a front elevation of one of the holding members.

FIG. 9 shows the state in which the flexible lines 5 are arranged over the upper case 3 suited for making the porous mold shaped to have vertical and sloped faces in addition to the horizontal face. Like FIG. 3, the flexible lines 5 are composed of the flexible lines 5a for the branch channels and the intersecting flexible lines 5b for the trunk channels. As best seen from FIG. 11, in the upper case 3, there are fixedly buried magnets 14 for releasably attracting the holding members 4 through iron strings 15 which are buried in the lower faces of the holding members 4. Each of these holding members 4 is formed at its leading end with the dent 6 in which the corresponding one of the flexible lines 5 is press-fitted. Thus, as shown in FIG. 10, the upper case 3 carrying the flexible lines 5 is combined with the base 7, and the porous mold forming slurry 9 is cast in the mold cavity defined by the two cases 3 and 7.

Figure 13:
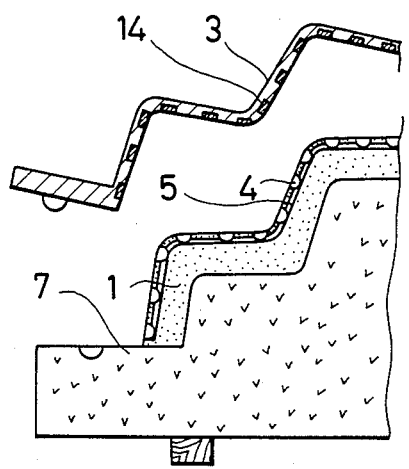
FIG. 13 is similar to FIG. 10 except for that the upper case is removed.

After the porous mold forming slurry has cured, the upper case 3 is disengaged from the porous mold 1. Then, the magnets 14 are removed from the holding members 4 to leave the holding members 4 in the porous mold (as shown in FIG. 13). After this, the holding members 4 are removed to leave the holes 11.

Figure 14:
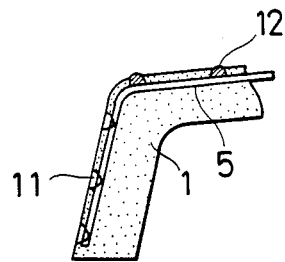
FIG. 14 shows in section the porous mold in which holes at the traces of the holding members are filled up with a resin.
Figure 15:
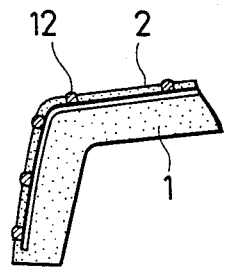
FIG. 15 shows in section the porous mold from which the flexible lines have been extracted.

Next, these holes 11 are filled up with the resin 12 (as shown in FIG. 14). After this filling resin 12 has cured, the flexible lines 5 are extracted to leave the channels 2 in the porous mold (as shown in FIG. 15).

Turning now to FIGS. 16 to 22, there is shown a modification of the method of making a porous mold which has vertical and sloped faces in addition to a horizontal face. In this modification, the portions for forming the vertical and sloped faces of the porous mold are made of soft rubber members 16, which are removably fitted in recesses 17 formed in the upper case 3 in a plane flush with the inner face of the case 3. These fittings may preferably be performed by the attractions between magnets 18 buried in the inner faces of the recesses 17 of the upper case 3 and iron strings 19 buried in the rear surfaces of the soft rubber members 16. The holding members 4 are fixedly buried at a predetermined interval and array in the inner faces of the soft rubber members 16, and other holding members 4 are also fixed in parallel with those of the soft rubber members 16 in the inner face of the horizontal portion of the upper case 3. Like the foregoing embodiments, each of the holding members 4 is formed at its leading end with the dent 6 in which the corresponding one of the flexible lines 5 is press-fitted. The soft rubber members 16 may preferably be made of soft urethane rubber, for example.

In the modification described above, the soft rubber members are used only in the portions of the upper case for forming the vertical and sloped faces. However, the upper case may be made of soft rubber as a whole and so attached by magnet attaching means that its shape may be held by a rigid backing material.

Figure 16:
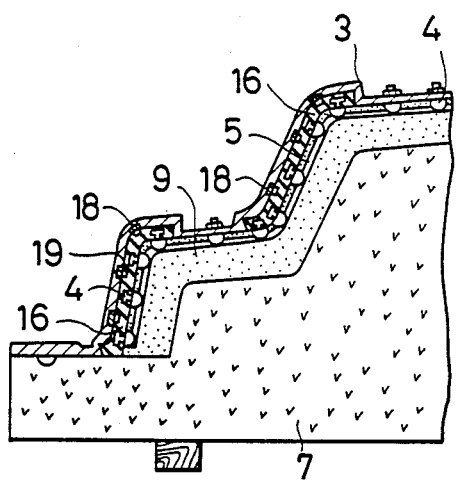
FIG. 16 is similar to FIGS. 4 and 10 but shows the state in which a porous mold is being made by a method according to the third feature of the present invention.
Figure 17:
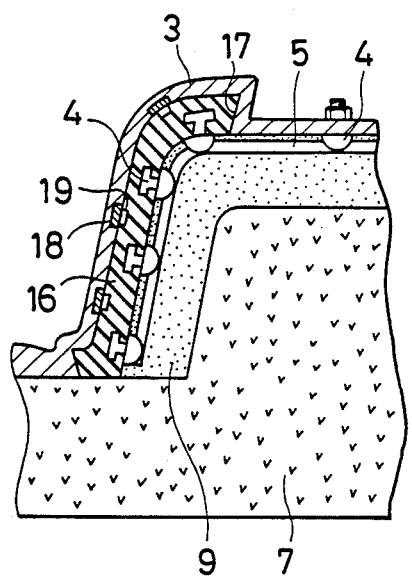
FIG. 17 is similar to FIG. 16 but shows an upper case and a soft rubber member in an enlarged scale.

Thus, as shown in FIG. 16, the rigid upper case 3 carrying the soft rubber members 16 and the flexible lines 5 is joined to the base 7, and the porous mold forming slurry 9 is cast into the mold cavity between the two cases 3 and 7. After the slurry 9 has cured, the upper case 3 is removed (as shown in FIG. 19). Then, the magnets 18 of the upper case 3 are disengaged from the buried iron strings 19 of the soft rubber members 16 to leave the soft rubber members 16 around the porous mold 1. At this time, the holding members 4 fixed on the upper case 3 are removed from the porous mold 1 simultaneously with the removal of the upper case 3. Next, the soft rubber members 16 are peeled off from the porous mold 1 (as shown in FIG. 20). Then, the holes 11 are formed in the porous mold 1 at the traces of the holding members 4 of the flexible lines 5 and are then filled up with the resin 12 (as shown in FIG. 21). After the filling resin 12 has cured, the flexible lines 5 are extracted to form the channels 2 in the porous mold 1 (as shown in FIG. 22).

FIGS. 23 to 27 show still another embodiment of the present invention, in which rigid lines are used as those for forming the branch channels whereas a flexible line is used as that for forming the trunk channel having communication with the outside of the mold.

Figure 23:
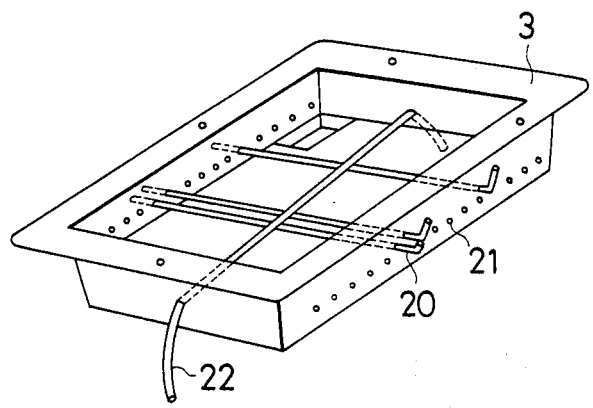
FIG. 23 is a perspective view of an upper case to be used in a method according to the fourth feature of the present invention.

As shown in FIG. 23, the rigid lines 20 are made of stainless steel, for example, and have a diameter of 1 to 5 mm, preferably 2 to 4 mm. The upper case 3 is formed in its opposite side walls with insert holes 21 for allowing the rigid lines 20 to be inserted there-through. The flexible line 22 is attached to the upper case 3 across the rigid lines 20 and has its end extending to the outside through the upper case 3.

Figure 24:
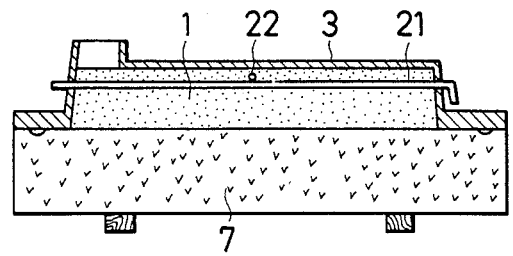
FIG. 24 shows in section the state in which the porous mold is being made by the use of the upper case of FIG. 23.
Figure 25:
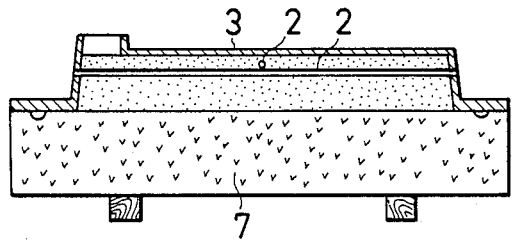
FIG. 25 is similar to FIG. 24 with the lines being extracted.
Figure 26:
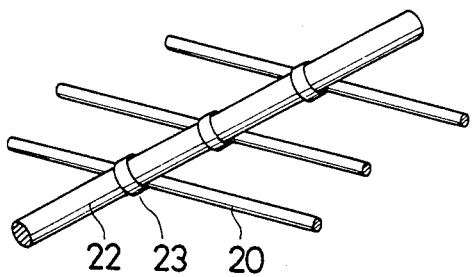
FIG. 26 is a perspective view of the relations between a rigid line and the flexible lines.
Figure 27:
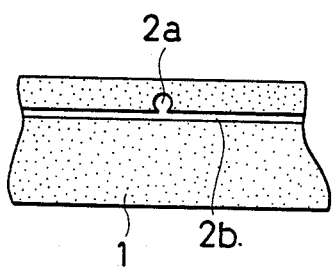
FIG. 27 shows in section a portion of the porous mold.

The upper case 3 and the base 7 are joined to each other, and the porous mold forming slurry 9 is cast into the mold cavity inbetween (as shown in FIG. 24). Next, the rigid lines 20 and the flexible line 22 are extracted from the porous mold and the upper case 3 (as shown in FIG. 25) after the slurry has cured. After this, the upper case 3 is removed from the porous mold 1. Thus, as shown in FIG. 27, there can be attained the porous mold 1 which is formed with the intersecting trunk and branch channels 2a and 2b. In order that communications may be ensured at the inter-sections between the trunk channel 2a and the branch channels 2b, the rigid lines 20 and the flexible line 22 may preferably be connected at their intersections by means of rings 23 (as shown in FIG. 26).

Figure 28:
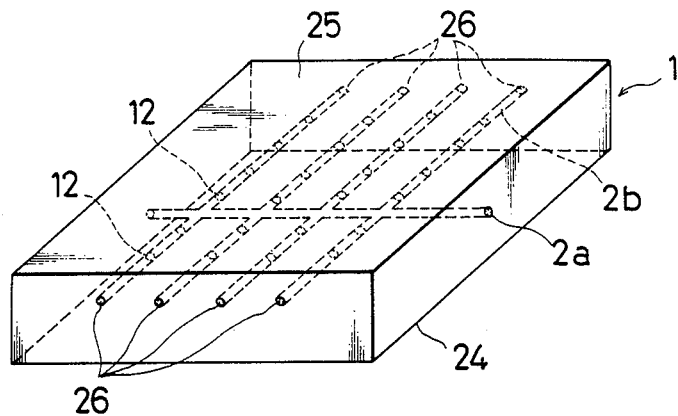
FIG. 28 is a perspective view of a porous mold in which the ends of the branch channels are closed with a resin.

FIG. 28 is a perspective view showing a porous mold 1. In the shown state, the holes, from which the flexible line holding members have been removed, are filled up with the resin 12 on the opposite face 25 of the porous mold 1 opposite to a molding surface 24, and the ends of the trunk channel 2a for providing communication with the outside and the branch channels 2b are closed with a resin 26 on the side faces of the porous mold.

Figure 29:
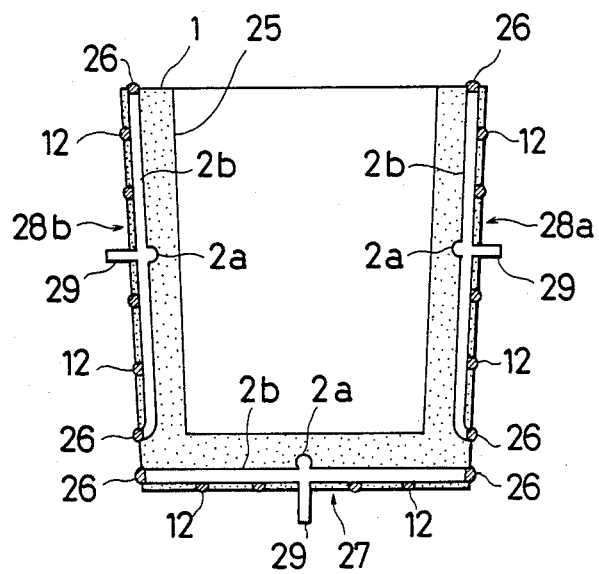
FIG. 29 shows in section the state in which a plurality of channels in a porous mold are independent of one another and have no communication with one another.

FIG. 29 is a section showing a rectangular porous mold 1. In the shown state, each one of a lower portion 27 and side portions 28a and 28b have branch channels which are made so independent of one another as to have no communication. Reference numerals 25, 2a and 2b denote the molding surface of the mold, the trunk channels and one of the branch channels of each portion, respectively. Numeral 29 denotes a portion of a pipe for providing communications between the trunk channels 2a and the outside of the mold.

As has been described hereinbefore, according to the method of the present invention, when a pressure casting porous mold is to be made, the upper case bearing the lines for forming the channels for water and air communications in the porous mold is used so that the spacing from the molding surface of the mold from the channels and the interval and diameter of the channels can be accurately controlled to substantially eliminate the defects concomitant with the prior art. Without any veteran skill, moreover, the lines can be attached remarkably promptly and simply in a predetermined array to the upper case so that the operating efficiency can be drastically improved.

What is claimed is:

1. A method of making a porous mold, comprising the steps of:
   attaching holding members in an array at a desired interval to an upper case made of a rigid material such that they project a predetermined distance from the inner surface of said upper case;
   removably attaching flexible lines to said holding members;
   passing at least one end of each of said flexible lines through said upper case to the outside of said upper case;
   joining said upper case to a base to form a molding cavity therebetween;
   casting slurry into a molding cavity which is defined by said upper case and said base to form a porous mold;
   removing said upper case together with said holding members from the porous mold after said slurry has cured so that said holding members are disengaged from said flexible lines to leave the latter in said porous mold;
   filling up the holes, which are left in the porous mold at the traces of said holding members, with a resin; and
   pulling said flexible lines out of the porous mold to form channels in said porous mold after said resin has cured.

2. A porous mold making method according to claim 1, wherein said flexible lines are made of elastic and strong rods or tubes having a circular or elliptical section.

3. A porous mold making method according to claim 2, wherein said rods or tubes are made of rubber selected from the group consisting of silicone or polyethylene.

4. A porous mold making method according to claim 3, wherein said resin is a putty-like adhesive having little fluidity before curing.

5. A method of making a porous mold, comprising the steps of:
   attaching holding members to an upper case by means of magnets fixed in the inner surface of said upper case at a desired interval;
   fixing flexible lines to said holding members with at least one end of each of said flexible lines extended to the outside of said upper case;
   joining said upper case to a base to form a molding cavity therebetween;
   casting slurry into said molding cavity to form a porous mold;
   removing said upper case from said porous mold, after said slurry has cured, to leave said holding members together with said flexible lines in the cured porous mold;
   extracting said holding members from said porous mold to leave holes;
   filling up said holes with a resin; and
   extracting said flexible lines from said porous mold, after said resin has cured, to form channels.

6. A method of making a porous mold, comprising the steps of:
   forming a recess in at least a portion of the inner surface of an upper case made of a rigid material;
   removably fitting a soft rubber member in said recess in a plane flush with the inner surface of said upper case;
   attaching holding members at a desired interval and in an array to the inner surface of said soft rubber member and the remaining portion of the inner surface of said upper case not covered by said soft rubber member such that said holding members project a predetermined distance;
   removably fixing flexible lines in said holding members with at least one end of said flexible lines extended through said upper case to the outer face of said upper case;
   joining said upper case to a base to form a molding cavity therebetween;
   casting slurry in said molding cavity to form a porous mold;
   removing said upper case together with its holding members from the surface of the porous mold, after said slurry has cured, to leave said soft rubber member on said porous mold;
   removing said soft rubber member together with its holding members from said porous mold to leave holes at the traces of said holding members;
   filling up said holes with a resin; and
   extracting said flexible lines from said porous mold, after said resin has cured, to form channels in said porous mold.

7. A porous mold making method according to claim 6, wherein said soft rubber member is made of soft urethane rubber.

8. A porous mold making method according to claim 6, wherein said upper case is made of said soft rubber member and attached by magnetic means so that its shape is held by a rigid backing material.

9. A porous mold making method according to claim 1, wherein said channels are composed of at least one trunk channel for providing communication between the inside and outside of said porous mold, and a plurality of branch channels intersecting and communicating with said trunk channel and having their open ends closed.

10. A porous mold making method according to claim 6, wherein said channels are directed into several independent groups, and each group includes a trunk channel communicating with the outside of the mold.

11. A porous mold making method according to claim 5, wherein said channels are composed of at least one trunk channel for providing communication between the inside and outside of said porous mold, and a plurality of branch channels intersecting and communicating with said trunk channel and having the open ends of said branch channels closed.

12. A porous mold making method according to claim 6, wherein said channels are composed of at least one trunk channel for providing communication between the inside and outside of said porous mold, and a plurality of branch channels intersecting and communicating with said trunk channel and having the open ends of said branch channels closed.

13. A porous mold making method according to claim 1, wherein said channels are directed into several independent groups, and each group includes a trunk channel communicating with the outside of the mold.

14. A porous mold making method according to claim 5, wherein said channels are directed into several independent groups, and each group includes a trunk channel communicating with the outside of the mold.

15. A porous mold making method according to claim 5, wherein said resin is a putty-like adhesive having little fluidity before curing.

16. A porous mold making method according to claim 6, wherein said resin is a putty-like adhesive having little fluidity before curing.

* * * * *